(12) United States Patent
Howard et al.

(10) Patent No.: US 10,442,315 B2
(45) Date of Patent: Oct. 15, 2019

(54) ROLLER COASTER WITH PASSENGER COMPARTMENT MOTION POWERED THROUGH STORED ONBOARD ENERGY

(71) Applicant: DISNEY ENTERPRISES, INC., Burbank, CA (US)

(72) Inventors: Derek Lee Howard, Pasadena, CA (US); Peyton B. Buhler, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 365 days.

(21) Appl. No.: 15/486,871

(22) Filed: Apr. 13, 2017

(65) Prior Publication Data
US 2018/0297486 A1 Oct. 18, 2018

(51) Int. Cl.
*A63G 31/02* (2006.01)
*B60M 7/00* (2006.01)
*B60M 1/30* (2006.01)

(52) U.S. Cl.
CPC .............. *B60M 7/00* (2013.01); *A63G 31/02* (2013.01); *B60M 1/30* (2013.01)

(58) Field of Classification Search
CPC .......... A63G 7/00; A63G 21/08; A63G 31/02; B60M 7/00; B60M 1/30
See application file for complete search history.

(56) References Cited

U.S. PATENT DOCUMENTS

| | | | | |
|---|---|---|---|---|
| 5,595,121 A | * | 1/1997 | Elliott | ............ A63G 7/00 104/288 |
| 6,220,171 B1 | * | 4/2001 | Hettema | ......... A63G 7/00 104/53 |
| 2002/0068641 A1 | * | 6/2002 | Dicicco | ............ A61K 9/14 472/60 |

(Continued)

FOREIGN PATENT DOCUMENTS

| | | |
|---|---|---|
| DE | 202010000403 U1 | 9/2011 |
| WO | 2008007569 A1 | 1/2008 |

OTHER PUBLICATIONS

EPO Search Report for EP Application No. 18153820.8-1126, dated Aug. 10, 2018.

*Primary Examiner* — Scott A Browne
(74) *Attorney, Agent, or Firm* — Marsh Fischmann & Breyfogle LLP; Kent A. Lembke (57) ABSTRACT

A roller coaster with a vehicle rolling under gravity along a track defining a ride path. The vehicle includes a chassis coupled to the track to roll on one or more surfaces of the track, and the vehicle includes a passenger compartment mounted on the chassis. The coaster also includes a compartment positioning mechanism that operates to move, such as with yaw, the passenger compartment between a first position in a passenger load/unload section of the ride path and one or more differing positions in the gravity-based ride section of the ride path. The coaster includes a power supply assembly with a charging element mounted on the track. The power supply assembly includes an onboard energy storage (Continued)

mounted on the vehicle that is charged by the charging element. The onboard energy storage powers the compartment positioning mechanism to move the passenger compartment between the first and second positions.

15 Claims, 6 Drawing Sheets (56) References Cited

U.S. PATENT DOCUMENTS

| | | | |
|---|---|---|---|
| 2007/0089630 A1* | 4/2007 | Gordon | A63G 7/00 104/53 |
| 2007/0089631 A1* | 4/2007 | Gordon | A63G 7/00 104/53 |
| 2007/0089632 A1* | 4/2007 | Gordon | A63G 7/00 104/53 |
| 2007/0106484 A1 | 5/2007 | Sweatman et al. | |
| 2011/0056407 A1* | 3/2011 | Roodenburg | A63G 7/00 105/49 |
| 2013/0017893 A1* | 1/2013 | Feuer | A63G 7/00 472/43 |
| 2015/0343317 A1* | 12/2015 | Foster | B62D 3/00 180/6.5 |
| 2016/0045833 A1* | 2/2016 | Boyle | A63G 31/02 700/275 |

* cited by examiner

ROLLER COASTER WITH PASSENGER COMPARTMENT MOTION POWERED THROUGH STORED ONBOARD ENERGY

BACKGROUND

1. Field of the Description

The present description relates, in general, to amusement park rides including roller coasters, and, more particularly, to a roller coaster with vehicles adapted to provide selective or programmable motion to the passenger compartment such as yaw (e.g., a programmable yaw profile) to orient the compartment and its passengers to face either along a direction of travel (DOT) or to one side or the other (e.g., to view a show or entertainment feature along the ride).

2. Relevant Background

Amusement and theme parks are popular worldwide with hundreds of millions of people visiting the parks each year. Park operators continuously seek new designs for rides that attract and continue to entertain park visitors. Further, it is often important to build upon or modify existing rides to provide park visitors with new and exciting experiences without the cost or inconvenience of replacing an existing ride with a completely new ride.

For example, it is much more desirable for a park operator to reuse an existing track and support structure than to remove these and build a completely new ride as this places a ride out of use for a longer period of time and, during construction, is more disruptive to nearby attractions. In some instances, a ride can be updated and modified by providing new show or visual features along the track that are visible not only as the vehicles travel in the DOT but also on one or both sides of the track. In such cases, it is desirable to provide a programmable yaw profile that is followed to rotate the passenger compartment about its vertical axis to have the passengers face to the left or right as the vehicle travels along the track.

The roller coaster is one of the more common and popular amusement park rides for providing a thrilling ride experience. In a typical roller coaster, the cars or vehicles are not self powered, but, instead, a coaster train of vehicles supported upon a track is pulled up a ramp or lift hill with a chain or cable to a peak of the coaster track. The potential energy accumulated by the rise in height is transferred to kinetic energy as the vehicles are released or dropped and race down the downward slope. Kinetic energy is then converted back to potential energy as the vehicle train moves up again to a second peak after which it then falls at rapid speed. This cycle is repeated throughout the ride until the vehicle train returns to the loading/unloading station. In most roller coasters, the rider or passenger is seated in an upright position with their back near vertical and facing the direction of travel (DOT) of the vehicle train along a supporting track.

Providing motion to a passenger compartment has continued to be a challenging design problem for designers, manufacturers, and operators of roller coasters. As mentioned above, roller coaster designs are demanded that provide programmable yaw profiles for a passenger compartment through a gravity-based coaster experience, and this need for motion of the passenger compartment is often desired even in sections of the track where bus bars or other power supplies/feeds are not feasible or practical. Presently, there are roller coasters that are configured to provide yaw motion to passenger compartments. These roller coasters are designed to have a track specially configured to allow a bus bar system to be provided along the length of the track, or at least along sections of the track where motion is desired, and the vehicle is able to continually draw power as it travels along the track to provide motion control.

However, it is very difficult to provide bus bar systems that are effective in corners and other sections of the track such as very steep sections where the vehicle is traveling rapidly. Hence, existing designs would not be able to provide any motion of the passenger compartment in many sections of conventional roller coasters as each includes many corners and other sections where it is impractical to provide a bus bar system. Further, track access, maintenance costs and procedures, and vehicle speed cause a bus bar system to be undesirable or even infeasible to implement for a long gravity-based coaster-type experience or ride.

There remains a need for a new gravity-based roller coaster design that allows a passenger compartment to be provided motion, including yaw, in addition to its travel along the DOT defined by the track. Preferably, these roller coasters would facilitate maintenance and provide the motion in any section of the track including corners and areas where vehicles are traveling at higher rates of speed while falling due to gravity (or stored potential energy being converted into kinetic energy) and where it is impractical to provide bus bar systems.

SUMMARY

The present description addresses the above problems by providing a roller coaster (or coaster-type ride system) in which a vehicle is configured with a drive system for providing motion to a passenger compartment relative to a chassis rolling along a track. The drive system is powered through power provided by one or more onboard storage devices such as batteries, capacitors, supercapacitors, and the like. For example, the passenger compartment may be caused to move according to a motion profile with yaw to rotate the compartment to the left or right from a load/unload position to cause the passengers to face show or visual display features along the ride path defined by the track.

Opportunity charge stations are provided in one or more sections of the track to recharge the onboard storage devices (such as with a capacitor charging plate in an unload/load station and with a bus bar strip in linear portions of the gravity-based ride sections), and the motion occurs in other sections of the track such as in curves or steep gravity-based ride sections of the track where connection to a bus bar or the like would be difficult and/or costly to implement and maintain.

More particularly, a roller coaster is provided that includes a track that defines a ride path, which includes a passenger load/unload section and a gravity-based ride section (i.e., a section where the vehicle travels under gravity and without onboard propulsion). The roller coaster has at least one vehicle including a chassis coupled to the track to roll on one or more surfaces of the track, and the vehicle includes a passenger compartment mounted on the chassis that is adapted for receiving one or more passengers. The roller coaster also includes a compartment positioning mechanism that is controllable to move the passenger compartment between a first position in the passenger load/unload section to a second position at a location in the gravity-based ride section.

Further, the roller coaster includes a power supply assembly that includes a charging element mounted on or near the track on the ride path defined by the track. The power supply assembly also includes an onboard energy storage mounted on the vehicle that is configured to be charged (or recharged) by the charging element. During a ride or during operations of the roller coaster, the onboard energy storage provides power to the compartment positioning mechanism to move the passenger compartment between the first and second positions. The charging element may be provided in the passenger load/unload section of the ride path and/or in the gravity-based ride section. In either case, the location in the gravity-based ride section where the passenger compartment is moved between the first and second positions is spaced apart a distance from the charging element, and, as a result, the onboard energy storage is disconnected from the charging element while powering the compartment positioning mechanism such that only stored energy is used to provide the motion to the passenger compartment.

The onboard energy storage typically includes at least one of the following: a battery, a capacitor, and a super capacitor. The charging element typically includes a capacitor charge plate, a bus bar, a bus bar charging strip, or the like, which is chosen and configured to recharge the batteries, capacitors, and/or supercapacitors of the onboard energy storage.

In some embodiments, the compartment positioning mechanism moves the passenger compartment from the first position to the second position by rotating the passenger compartment about a vertical axis of the passenger compartment, whereby a yaw motion is provided in the gravity-based ride section. In such embodiments, the compartment positioning mechanism may include a drive assembly (e.g., with an electric motor) powered by the onboard energy storage to provide the rotating via a yaw bearing or a slewing ring. In some preferred embodiments, the coaster further includes a controller operable to operate the compartment positioning mechanism to provide movement of the passenger compartment between the first and second positions based on a motion profile stored in memory on the vehicle or based on a sensed motion trigger positioned along the track proximate to the location in the gravity-based ride section.

DETAILED DESCRIPTION

The following description is generally directed to an amusement park ride such as a roller coaster that can be used with existing and new tracks to provide a ride experience with vehicles with passenger compartments that can be selectively positioned in at least two positions. For example, an onboard motion control system may operate to implement a programmable yaw profile (or other motion profile) to place the compartment in a first position with the passenger compartment and passengers (in the compartment) facing forward along the DOT defined by the track (e.g., in a load/unload position of the compartment) and a second position with the passenger compartment and passengers facing a direction differing from the DOT such as due to a yaw movement defined by the yaw/motion profile.

The motion control system is powered with electrical energy that is stored in one or more energy storage devices mounted on the roller coaster vehicle (such as on the vehicle chassis that rides on the track and supports the passenger compartment). This compartment motion is provided concurrently with (or in addition to) the vehicle's travel along sections of the track under gravity (e.g., in gravity portions of the track), and, due to the onboard storage of energy, the additional compartment motion often will occur where there is no bus bar and where one would be difficult if not wholly impractical to implement such as in a corner or steep downward hill. The roller coaster is configured to use "opportunity charging" from one or more power sources or charging elements provided at one or more locations along the track (i.e., track-based power sources). The track-based power sources may be provided in the load/unload station, in lift hill sections of the track, and/or in straight or linear sections of the track. The motion profile is typically designed to cause the motion control system to power rotation using the onboard stored energy when the vehicle's onboard power supply assembly is not in contact with a track-based power source/charging element.

Figure 1:
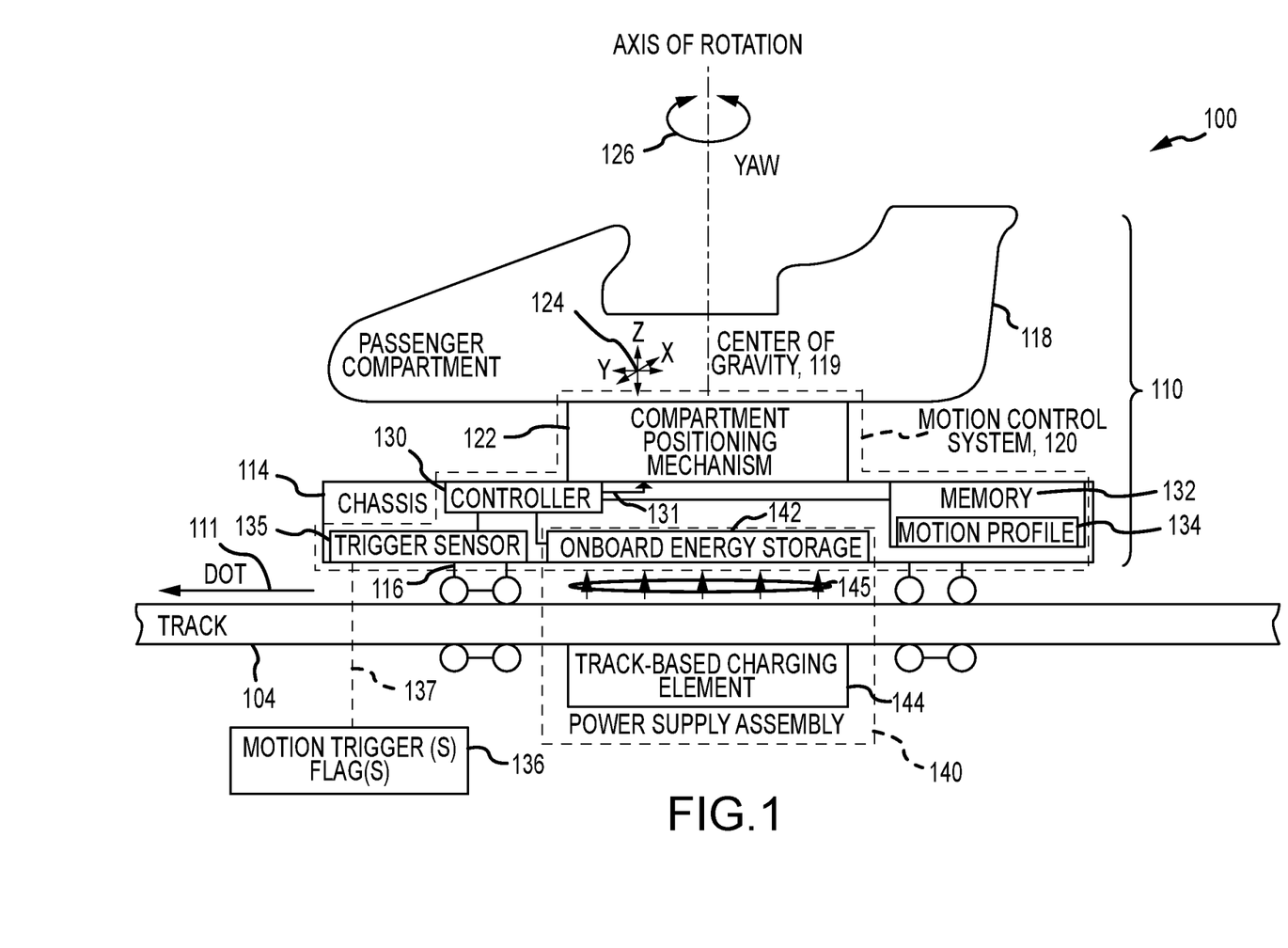
FIG. 1 is a function block or schematic illustration of a portion of roller coaster or ride system according to the present description showing a vehicle adapted for providing motion to its passenger compartment as the vehicle travels along a track with power provided with onboard energy storage.

FIG. 1 is a functional block illustration of a portion of a roller coaster or ride system 100 illustrating a single vehicle 110 riding along a section of track 104 under gravity in a direction of travel (DOT) as shown with arrow 111. A typical ride 100 would include a plurality of such vehicles 110 that may be coupled together into a train or ride separately on the track 104. The vehicle 110 includes a chassis or frame 114 that is coupled to and rolls upon the track 104 via a set of wheel/bogie assemblies 116 such that the vehicle 110 is constrained to follow the track 104 along the DOT 111, and the assemblies 116 are configured to maintain a gap or separation between the bottom of the chassis 114 and the top of the track 104.

The vehicle 110 further includes a passenger compartment 118 for holding one or more passengers in seats and with proper constraints (not shown but well understood in the arts). The passenger compartment 118 is shown in a first position (or first orientation) such that the seats and any passengers in such seats faces forward or along the DOT 111 defined by the track 104. During operations, though, the passenger compartment 118 is positionable in two or more other positions (second, third, fourth, or more positions or orientations) such that the seats and passengers face a direction that is at an angle to the DOT 111. For example, yaw motion may be provided as shown with arrow 126 about an axis of rotation of the passenger compartment (which may extend vertically through the center of gravity 119 of the passenger compartment or be the vehicle's vertical axis) to orient the passenger compartment to the left or right of the DOT 111 at an angle in the range of 15 to 90 degrees or more such as to cause the passengers to view a visual display or the like along a particular section of the track 104. In some embodiments, the motion of the compartment 118 from the first or load/unload position shown may be along any of two or more of the X, Y, and Z axes as shown with arrow 124 (e.g., any movement along a degree of freedom other than the vehicle motion along the DOT 111).

To provide controlled (and programmable) motion, the vehicle 110 includes a motion control system 120. The motion control system 120 includes a compartment positioning mechanism 122 that couples the passenger compartment 118 with the chassis 114 such that the passenger compartment 118 rolls along the track 104 with the chassis 114. The compartment positioning mechanism 122 may take many forms to practice the roller coaster 100 and will vary in configuration to provide a desired type of motion 124 and/or 126.

In some cases, the mechanism 122 includes an electrical drive such as a linear actuator, a variable frequency drive (VFD), or the like that moves/drives with one or more gears, belts, chains, shafts, and/or the like to rotate 126 and/or pivot 124 or otherwise move a pedestal/column support element affixed to the passenger compartment. In some cases, the mechanism 122 is configured to provide continuous rotation (e.g., 360-degree rotation about the axis of rotation as shown with arrows 126 and/or a plurality of yaw positions may be provided for compartment ranging from several to nearly infinite about the axis or rotation) while other embodiments may provide a smaller predefined range of motion. The drive mechanism may be a drive motor or the like to provide the rotation 126 while other embodiments may use a device(s) that provides linear actuation (e.g., a hydraulic actuator, a pneumatic actuator, an electric ball-screw actuator, or the like). As will be appreciated, nearly any type of actuator and/or drive arrangement may be used to implement the compartment positioning mechanism 122.

The motion control system 120 also includes a number of chassis-mounted devices to selectively power and operate the compartment positioning mechanism 122. As shown, the system 120 includes a controller 130 that generates control signals (and/or provides power) 131 to the compartment positioning mechanism 122 to operate to provide the motion 124 and/or 126. The yaw 126 or other motion 124 may be defined in its type, magnitude, and timing (what position along the track 104) by a motion profile 134 stored in memory/data storage 132 on the chassis 114. In the same or other cases, one or more motion triggers or flags 136 may be provided at locations along the track 104 and a trigger/flag sensor 135 senses as shown at 137 each of these triggers/flags 136, and the controller 130 may initiate 131 a particular type of motion 124 and/or 126 based on the sensed trigger (which may be desirable to limit reliance on less accurate timing of motions based on a programmed profile 134).

To provide power to the controller 130 and the compartment positioning mechanism 122, the roller coaster 100 includes a power supply assembly 140. Significantly, the power supply assembly 140 includes onboard energy storage 142 that is mounted upon the vehicle 110 such as on or in the chassis 114. Onboard energy storage 142 can be selectively used by the controller 130 to power operations of the compartment positioning mechanism 122 even when the vehicle 110 is spaced apart from any track-based power source such as in a curved or steep downward hill of the track 104.

In FIG. 1, the vehicle 110 is shown to be over or adjacent a track-based charging element (power source) 144 of the power supply assembly 140. Stated differently, FIG. 1 illustrates the roller coaster 100 during charging operations with the track-based charging element 144 providing electrical power to the storage device(s) 1442 as shown schematically with arrows 145. After the charging of onboard energy storage 142 as shown with the charging element 144, the vehicle 110 will roll along the track 104 in the DOT 111 and be spaced apart from any such power sources (i.e., not coupled to a bus bar or the like). In these sections of track, the controller 130 may operate the compartment positioning mechanism 122 with control signals/power 131 from the onboard energy storage 142 to provide the yaw 126 or other motions 124 to the passenger compartment 118 (i.e., during discharging operations where the vehicle 110 is in a section of the track 104 free of any charging elements/power supplies 144).

The storage of electrical energy may be achieved with the onboard energy storage 142 including one or more of the following (or a combination thereof): a battery, a capacitor, and a super capacitor. The capacity of these devices would be chosen to match or exceed the amount of energy needed to power the positioning mechanism 122 between charging sections of the track 104 (as shown in FIG. 1) or between charges (with the understanding that not every charging opportunity may provide a full recharge). The track-based charging element 144 may be provided in a variety of forms, too, such as with a capacitor charge plate for use in sections of the track 104 where the vehicle is stationary/static such as during loading/unloading at the station section of the track 104. In other cases, the charging element 144 is provided in the form of a bus bar charging strip or the like provided in a straight or linear stretch of the track (where the vehicle 110 may be traveling less rapidly in some cases such as in or upstream of a lift section). The charging provided in such spaced apart straight or linear sections of the track 104 is then later used during discharging operations where the vehicle 110 may be in a curved section of the track 104 or in another section where no power source is provided/available.

Figure 2:
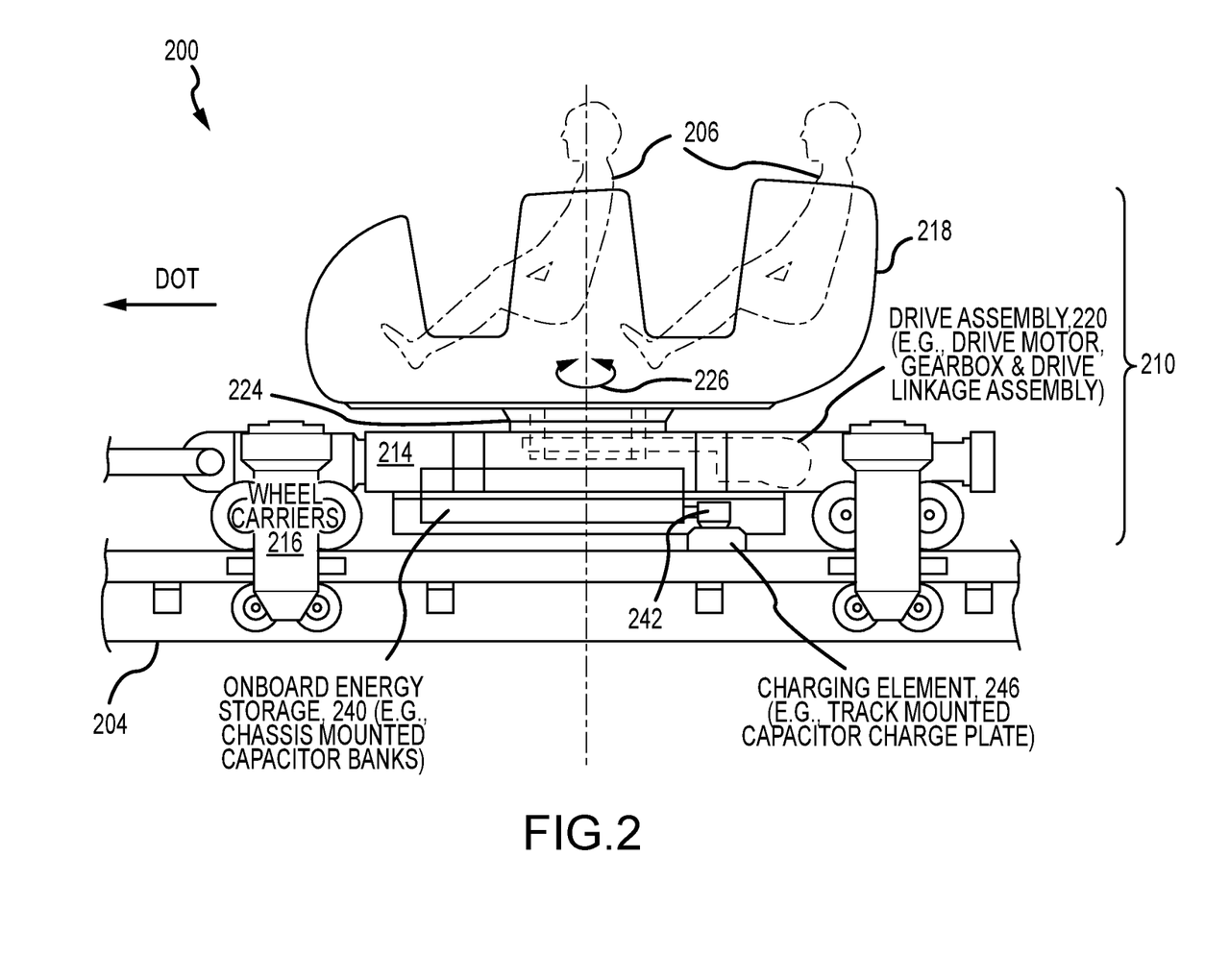
FIG. 2 is a side view of a portion of a roller coaster, such as may be used to implement the roller coaster of FIG. 1, providing details of one exemplary embodiment of vehicle and track-based charging components.

FIG. 2 is a side view of a portion of a roller coaster 200, such as may be used to implement the roller coaster 100 of FIG. 1. FIG. 2 is useful for illustrating or providing details of one exemplary embodiment of vehicle and track-based charging components. The roller coaster 200 is shown to include a track 204 arranged in a pattern to provide a gravity-based experience with a vehicle 210 rolling via wheel carriers 216 on track 204. The wheels in carriers 216 are not powered and gravity is used to move the vehicle 210 along a ride path defined by the track 204 in a direction of travel. Often, the track 204 will include a load/unload station or section in which passengers 206 are loaded and unloaded from the vehicle 210 and, in other sections of the track, the vehicle 210 typically will be moving at some velocity in the DOT (or will be moving slowly in the DOT in a lift section of the track 204).

Figure 3:
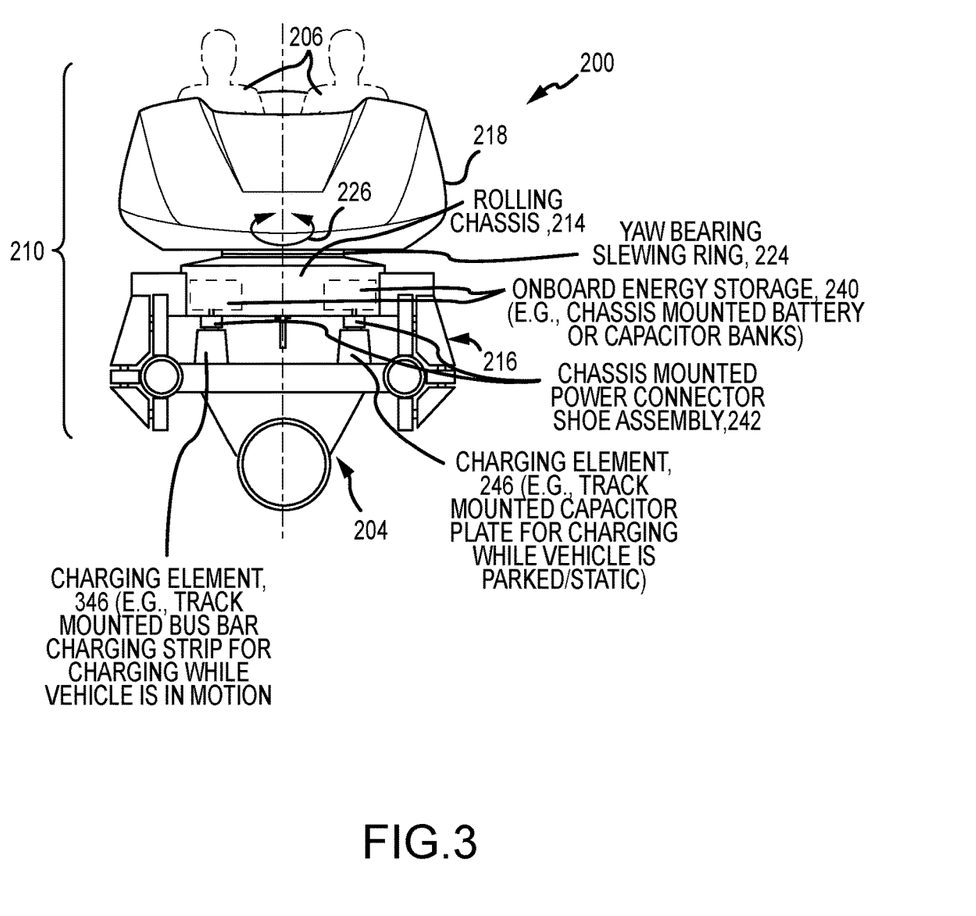
FIG. 3 is a front view of the roller coaster shown in FIG. 2 showing two different approaches to charging an onboard energy storage element as may be used in two different sections of the track.

The vehicle 210 includes a chassis 214 that rolls upon and is coupled with the track 204 via the wheel carriers 216 (e.g., one or two such carriers or four as shown in FIGS. 2 and 3). A passenger compartment 218 is provided in the vehicle 210 with seating for one or more passengers 206 (with four shown in FIGS. 2 and 3). The passenger compartment 218 is physically coupled to and supported by the chassis 214 such that it rolls along the track 204 in the DOT with the chassis 216 under gravity (except in optional lift sections, in a launch mechanism, or the like) as the vehicle 210 does not include a powered propulsion system.

The vehicle 210 is configured to selectively provide yaw to the passenger compartment 218 as shown with arrow 226 (or to provide rotation in one or both the clockwise and counterclockwise directions about a yaw axis of rotation (e.g., a vertical axis of the vehicle 210 that may extend through the center of mass or gravity of the vehicle 210)). The yaw movement 226 may be programmable such as via the use of a motion profile/ride program (as shown in FIG. 1) defining when/where and in which direction and to what magnitude run by a controller of the drive assembly 220 and/or may be triggered using flags/trigger elements positioned near the track 204.

In the vehicle 210, yaw motion 226 is provided via a drive assembly 220 mounted on or in the chassis 214 that is powered (with electricity) by onboard energy storage 240. The drive assembly 220 may include an electric drive motor selectively operated to provide the yaw profile or respond to triggering signals, and the drive assembly 220 may further include a gearbox and/or a drive linkage assembly to rotate the vehicle compartment 218 via a yaw bearing, slewing ring, or the like 224 (i.e., any useful rotatable coupler or coupling element).

The onboard energy storage 240 may take the form of one or more batteries, capacitors, and supercapacitors or a combination thereof. As shown in FIGS. 2 and 3, the onboard energy storage 240 is provided in the form of two banks of capacitors that are mounted within or on the chassis 214. The capacitor banks 240 are chosen to have a capacity that allows them to store adequate amounts of energy to discharge electricity to the drive assembly 220 to rotate 226 via the yaw bearing/slewing ring 224 in between charging stations/locations on the track 204. Charging at the location or section of the track 204 shown in FIG. 2 is achieved by providing a charging element 246 nearby or even mounted on the track in combination with a chassis-mounted element for receiving a charge 242. The charging element 246 may take the form of a track-mounted capacitor charge plate (which is wired to a power source (not shown) and the element 242 may take the form of a chassis-mounted power collector shoe assembly. The section of track 204 shown in FIG. 2 may be a station or other section along which the vehicle 210 is stationary/static/parked such as for loading and unloading the passengers 206 in the compartment 218.

FIG. 3 illustrates the roller coaster 200 with an end view (front view) of the track 204 that is useful for showing capacitor bank 240 that is charged by the charging element 246 when the vehicle 210 is in a section of the track 204 in which the vehicle is stationary. FIG. 3 is also useful for showing that, in this embodiment of the roller coaster, the vehicle 210 further includes a second capacitor bank 240 (or right bank) that is charged when the vehicle 210 is moving the DOT along a different or downstream/later section of the track from that shown in FIG. 2.

In FIG. 3, the vehicle 210 has moved to this different section of the track 204 (or will soon travel through this section), and, while in motion, the capacitor bank 240 is charged by a charging element 346 in the form of a track-mounted bus bar charging strip that extends along a length of the track 204. The track 204 typically is linear or straight in this section to facilitate charging while the vehicle 210 is moving and to facilitate use of a bus bar 346 of a particular length. The vehicle 210 is further shown to include a separate chassis-mounted power collector shoe assembly 242 that is between the capacitor bank 240 and the charging element 346 when the vehicle 210 is moving along the section of track 204 shown in FIG. 3. In FIG. 3, the left power collector shoe assembly 242 would typically not be adjacent or even contacting the charging element 246, as the roller coaster 200 is configured with two differing types of charging elements 246 and 346 to provide opportunity charging when the vehicle 210 is stationary/parked and when it is moving along a straight or linear section of the track 204.

In many embodiments, a roller coaster will be provided with a plurality of the energy storage devices and track-based charging element pairs to provide opportunity charging stations at a plurality (e.g., 2 to 10 or more) of locations along the track. For example, there may be ten locations along the track where it is desirable to provide yaw or other motions to the passenger compartment, and one of the opportunity charging stations may be provided upstream of each of these ten locations. In other cases, though, each charge provided by one of the opportunity charging stations will be large enough to allow operations of the compartment positioning mechanism in two, three, or more of the locations on the track where motion is programmed in a motion profile or where motion is triggered such as by a flag/triggering element nearby the track.

Typically, the set of opportunity charging stations will be a mix of power supply assemblies configured for use when the vehicle is parked (e.g., charging element 246 with an appropriate power connector shoe assembly 242 and a storage device (such as a capacitor bank 240 (which may include capacitors and/or supercapacitors) shown in FIGS. 2 and 3) or a battery) and assemblies configured for use when the vehicle is in motion along a straight/linear stretch of the track (e.g., charging element 346 with an appropriate power connector shoe assembly 242 and a storage device (such as a capacitor bank 240 (which may include capacitors and/or supercapacitors) shown in FIGS. 2 and 3) or a battery).

Figure 4:
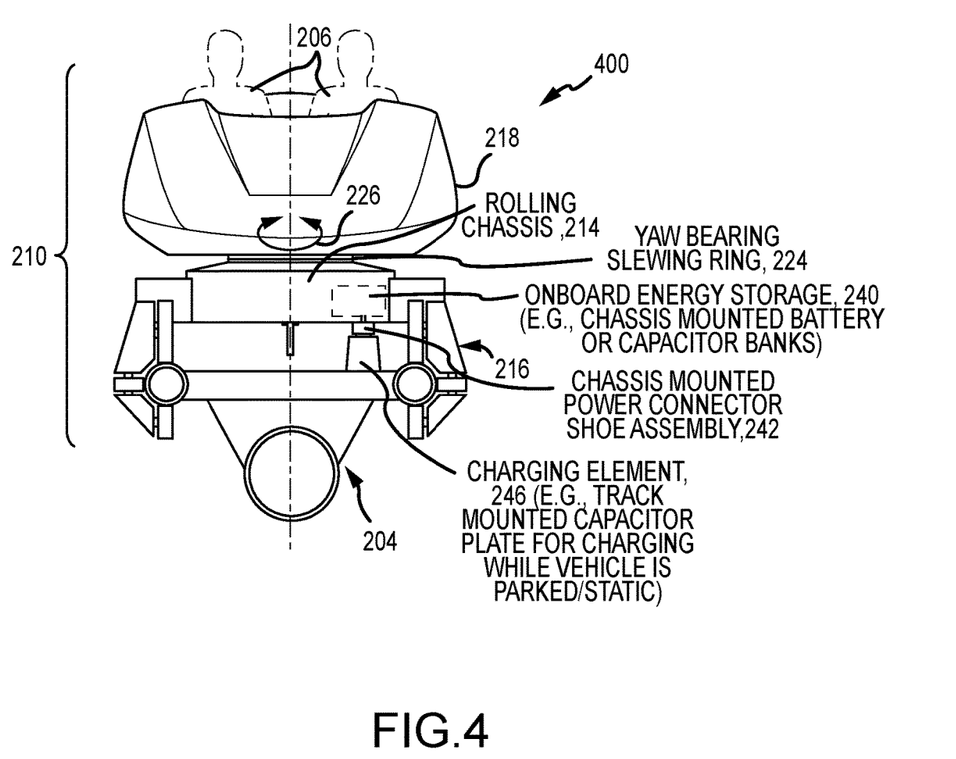
FIG. 4 is a front view of a roller coaster that is similar to the coaster of FIGS. 2 and 3 but that only includes the charging components useful when the vehicle is parked or stationary on the track.
Figure 5:
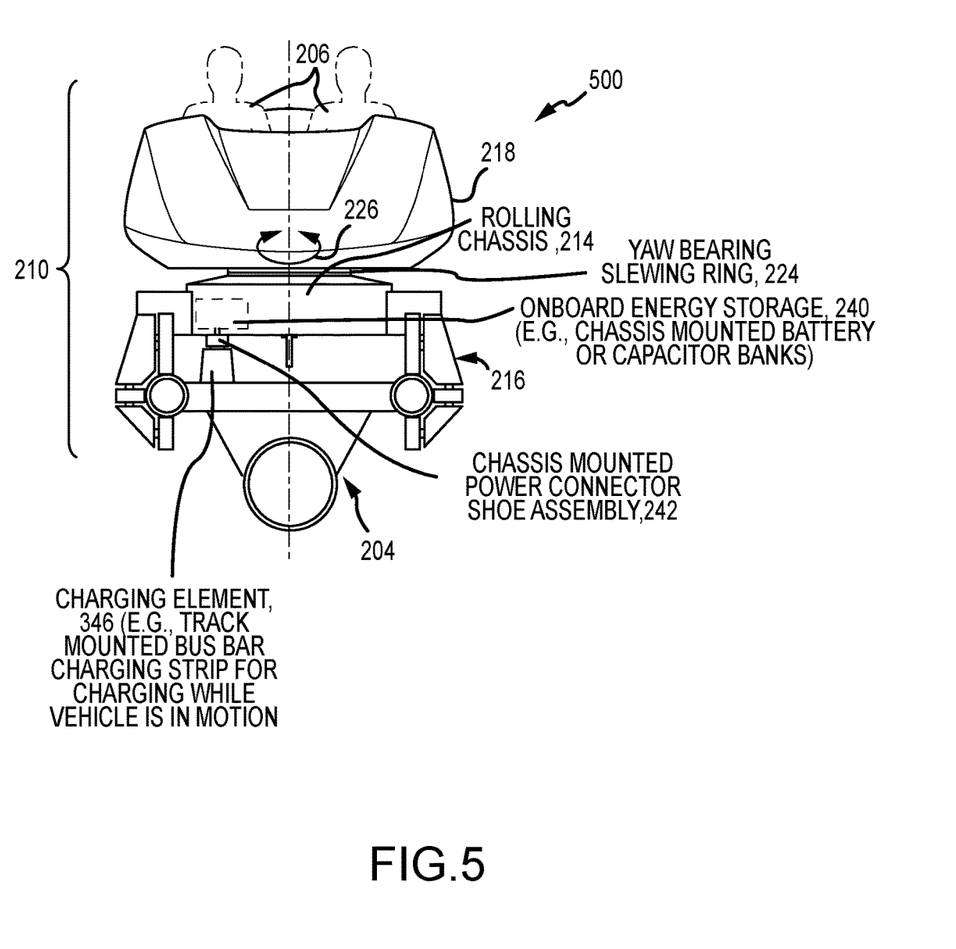
FIG. 5 is a front view of a roller coaster that is similar to the coaster of FIGS. 2 and 3 but that only includes the charging components useful when the vehicle is moving along a linear or straight section of the track.

In other roller coaster implementations, though, charging may only occur either when the vehicle is stationary or when the vehicle is in motion. These two embodiments are shown in FIGS. 4 and 5. FIG. 4 illustrates a roller coaster 400 configured similarly to the coaster of FIGS. 2 and 3, but the roller coaster 400 has its onboard energy storage 240 charged only when parked (such as at a station for loading/unloading passengers 206). This charging is achieved via track-mounted (or track-based) charging element(s) 246 and electrical coupling with chassis-mounted power connector shoe assembly (or assemblies) 242, which is electrically connected to the capacitor bank 240. Once the onboard energy storage 240 is charged, the vehicle 210 may leave the station (such as via a lift hill or a launch mechanism) and, while traveling through gravity-based motion sections of the track, the drive assembly 220 would be powered by the onboard energy storage 240 to move the passenger compartment 218 through a programmable or triggered/flagged yaw profile for the ride path of the roller coaster 400.

FIG. 5 illustrates a roller coaster 500 configured similarly to the coaster of FIGS. 2 and 3, but the roller coaster 500 has its onboard energy storage 240 charged only when the vehicle 210 is in motion such as along linear or straight sections of the track 204. This charging is achieved via track-mounted (or track-based) charging element(s) 346 and electrical coupling with chassis-mounted power connector shoe assembly (or assemblies) 242, which is electrically connected to the capacitor bank 240. With the onboard energy storage 240 charged or storing power, the vehicle 210 may continue traveling through gravity-based motion sections of the track, and the drive assembly 220 would be powered by the onboard energy storage 240 to move the passenger compartment 218 through a programmable or triggered/flagged yaw profile for the ride path of the roller coaster 500.

Figure 6:
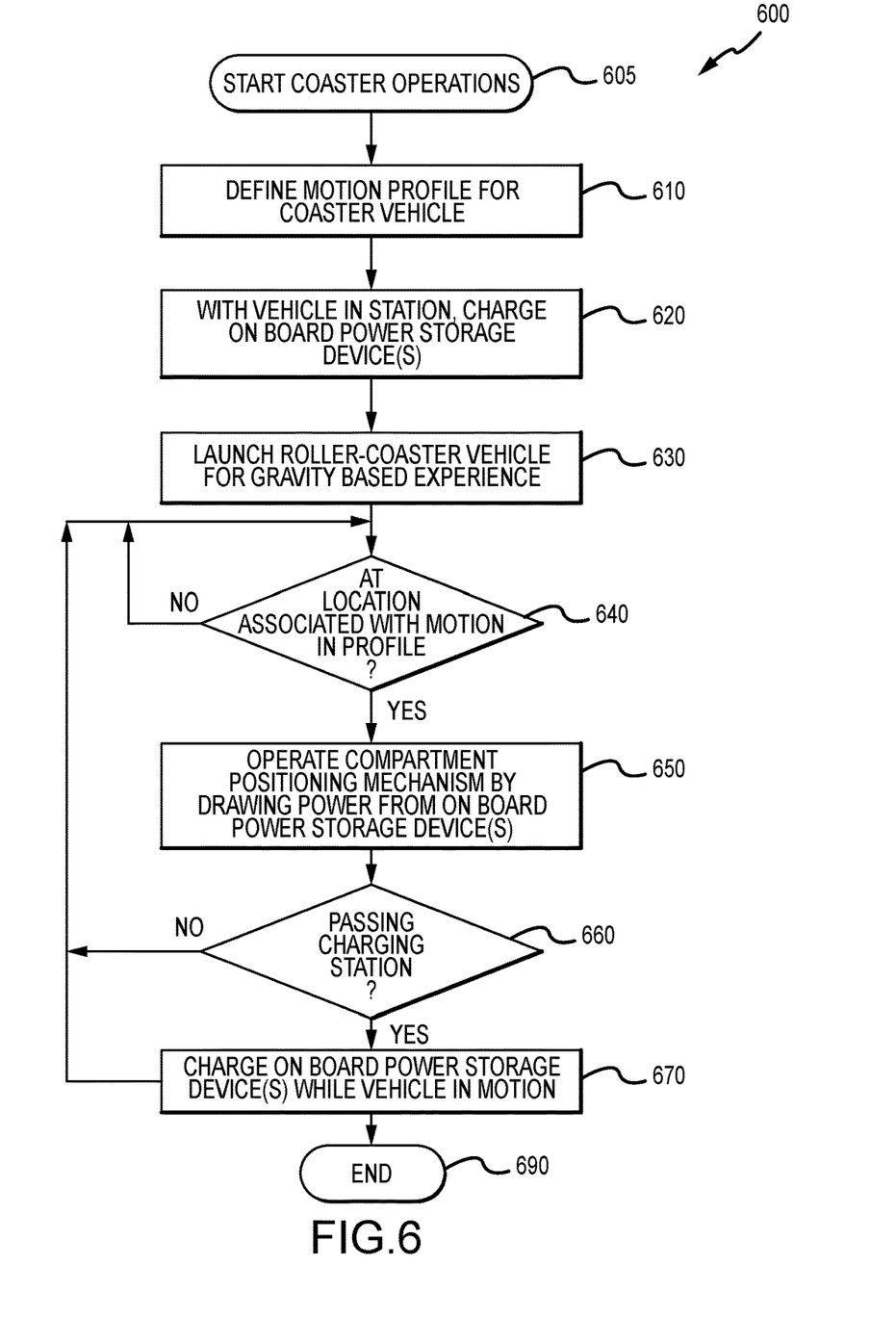
FIG. 6 is a flow diagram of a method of operating a roller coaster of the present description (such as one of the implementations of FIGS. 1-3) to provide a gravity-based ride experience.

FIG. 6 illustrates a flow diagram for operating or controlling 600 a roller coaster of the present description (such as coaster 100 or 200) to provide a gravity-based ride with a passenger compartment provided motion with onboard stored power. The method 600 begins at 605 such as with configuring a roller coaster to include one or more power storage devices (e.g., batteries, capacitors, super capacitors, or the like) on one or more of its vehicles such as with mounting on the chassis. Further, in 605, the track may be modified to include one-to-many charging stations by mounting track-based charging elements that are connected to facility power (electricity sources).

Charging at these stations may be achieved via electrical coupling/connection (with or without contact as practical) between the track-mounted component (e.g., a capacitor charge plate, a bus bar, a bus bar charging strip, or the like) and the vehicle-mounted element adapted for receiving a charge (e.g., a power connector shoe assembly configured for electrically coupling with the track-mounted component). The stations may be thought of as "opportunity charging stations" as they may be provided in sections of the track that are better suited for charging operations. For example, the stations may be provided in sections of the track where the vehicle may be parked (such as the station), may be moving slowly such as in lift hills, and/or may be moving along a straight/linear section of the track under gravity (such as upstream of motion locations defined in a motion profile).

The method 600 continues at 610 with defining a motion profile for each of the vehicles that travel along the ride path defined by the supporting track. The motion profile may define what type of motion (such as pitch, roll, or yaw), and its magnitude, is to be provided by the compartment positioning mechanism and at which locations along the track. The motion profile may be stored in memory on the vehicle for later use by a controller to selectively operate the compartment positioning mechanism (such as by timing the motion from a departure time from a station or from a passed point on the track or by determined position of the vehicle). In other cases, the motion profile is used to define where on the track one or more flags/triggering elements should be placed for sensing by an onboard vehicle to trigger a particular motion of the compartment.

The method 600 continues at 620 with the vehicle positioned or parked in the station for passenger unloading/loading. With the vehicle in this stationary state, a station-based charging station is used (e.g., the onboard power storage is electrically coupled with a charging element on or near the track of the station at each vehicle parking location) to charge or store power in the onboard storage device(s). The method continues at 630 with launching or initiating a gravity experience for the vehicle (e.g., the vehicle (or a train of vehicles) is pulled up a lift hill at the start of a ride and released at this high(er) point of the track or a launch mechanism is used to provide the vehicle with an initial amount of kinetic energy).

The method continues at 640 with a determination (such as by a controller via timing/position determination and a motion profile or in response to a sensed motion triggering element/flag) of whether or not the vehicle is at or approaching a location on the track associated with a motion in the motion profiled defined in step 610. If not, the step 640 is repeated. If yes, the method 600 continues at 650 with the controller operating the compartment positioning mechanism via electrical power drawn or discharged from the onboard power storage device(s) to move the passenger with the motion defined by the profile for or triggered by a flag at the vehicle's position on the track (e.g., rotate 15 to 90 degrees to the left or right about the vertical axis of the vehicle (yaw motion)).

The method 600 then continues with determination of whether the vehicle is passing a charging station adapted for charging the onboard power storage while the vehicle is in motion (or this step 660 may be omitted from method 600 or considered automatically performed). If not, the method 600 continues with repeating step 640. If yes, the method 600 continues at 670 with charging the onboard power storage device(s) while the vehicle continues to move along the section of the track (e.g., a linear gravity portion of the track (i.e., a portion of the track where the vehicle is moving under gravity)) that includes a track-based charging element (e.g., element 346 in FIG. 3). The method 600 may then continue with repeating steps 640-670 or may end as shown at 690, such as when the vehicle has traveled along the entire ride path and returned back to the station (where method 600 may be repeated starting at step 620 once passenger unloading is completed).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As can be appreciated from the foregoing, a roller coaster is taught that includes onboard power storage for its passenger-carrying vehicles and includes one-to-many charging stations for the vehicles parked and/or in motion on the track. The passenger-carrying vehicle rides on a structural track, which is positioned below or above the vehicle to support and guide the vehicle along a fixed and continuous path loop on a gravity ride experience. The coaster also includes a passenger compartment positioning (articulation) system that used power from the onboard power storage to operate so as to orient or move the passenger compartment when the vehicle is moving under gravity through the ride portion of the track. The coaster may also include an immersive show environment/presentation or adjacent show structure along the ride portions of the track that is arranged and/or configured so as to be viewable by the passengers in the vehicle when the passenger compartment is moved with yaw or another motion (that may be defined in a motion profile or may be triggered by trigger or flag elements along the track).

We claim:

1. A roller coaster, comprising:
   a track defining a ride path with a passenger load/unload section and a gravity-based ride section;
   a vehicle including a chassis coupled to the track to roll on one or more surfaces of the track, wherein the vehicle further includes a passenger compartment supported on the chassis that is adapted for receiving one or more passengers;
   a compartment positioning mechanism controllable to move the passenger compartment between a first position in the passenger load/unload section to a second position at a location in the gravity-based ride section; and a power supply assembly comprising a charging element mounted on or near the track on the ride path defined by the track and further comprising an onboard energy storage mounted on the vehicle adapted for charging by the charging element, wherein the onboard energy storage provides power to the compartment positioning mechanism to move the passenger compartment between the first and second positions, and wherein the charging element is provided in the gravity-based ride section wherein the location in the gravity-based ride section where the passenger compartment is moved between the first and second positions is spaced apart a distance from the charging element, whereby the onboard energy storage is disconnected from the charging element while powering the compartment positioning mechanism.

2. The roller coaster of claim 1, wherein the onboard energy storage comprises at least one of the following: a battery, a capacitor, and a super capacitor.

3. The roller coaster of claim 2, wherein the charging element comprises at least one of the following: a capacitor charge plate, a bus bar, and a bus bar charging strip.

4. The roller coaster of claim 1, wherein the compartment positioning mechanism moves the passenger compartment from the first position to the second position by rotating the passenger compartment about a vertical axis of the passenger compartment, whereby a yaw motion is provided in the gravity-based ride section.

5. The roller coaster of claim 4, wherein the compartment positioning mechanism comprises a drive assembly powered by the onboard energy storage to provide the rotating via a yaw bearing or a slewing ring.

6. The roller coaster of claim 1, wherein the charging element comprises a first charging element provided in the passenger load/unload section of the ride path and a second charging element provided in the gravity-based ride section and further wherein the onboard energy storage comprises a first electrical storage device being charged by the first charging element and a second electrical storage device being charged by the second charging element.

7. The roller coaster of claim 1, further comprising a controller operable to operate the compartment positioning mechanism to provide movement of the passenger compartment between the first and second positions based on a motion profile stored in memory on the vehicle or based on a sensed motion trigger positioned along the track proximate to the location in the gravity-based ride section.

8. A park ride comprising:
a structural track;
a vehicle with a chassis riding on the structural track, wherein the structural track guides the chassis, and a passenger compartment supported on the chassis, along a ride path from a station section of the structural track through a gravity-based ride section of the structural track back to the station section;
an onboard energy storage comprising a first energy storage device and a second energy storage device mounted on the vehicle;
a first charging device provided in the station section of the track that is operable to charge the first energy storage device when the vehicle is parked in the station section of the track;
a second charging device provided at a first location on the gravity-based ride section that is operable to charge the second energy storage device as the vehicle moves past the first location on the structural track; and a drive assembly powered by at least one of the first and second energy storage devices to move the passenger compartment relative to the chassis at a second location on the gravity-based ride section that is spaced apart from the first location whereby the onboard energy storage is disconnected from the first charging device and the second charging device while the onboard energy storage is powering the drive assembly.

9. The ride of claim 8, wherein the first energy storage device comprises at least one capacitor or supercapacitor and wherein the first charging device comprises a capacitor charge plate.

10. The ride of claim 8, wherein the second energy storage device includes at least one battery, capacitor, or supercapacitor and wherein the second charging device comprises a bus bar charging strip.

11. The ride of claim 8, further comprising a first power collector shoe assembly mounted on the chassis electrically coupling the first energy storage device to the first charging device and a second power collector shoe assembly mounted on the chassis electrically coupling the second energy storage device to the second charging device.

12. The ride of claim 8, wherein the drive assembly moves the passenger compartment through a yaw movement defined by a motion profile for the second location or in response to sensing a trigger along the structural track at or proximate to the second location.

13. The ride of claim 8, wherein the second location on the gravity-based ride section is in a curved portion of the structural track and wherein the first location on the gravity based ride section is in a linear portion of the structural track.

14. A roller coaster, comprising:
a track;
a vehicle supported upon the track and adapted to roll along a path defined by the track, wherein the vehicle comprises a chassis coupled to the track and a passenger compartment supported on the chassis;
a controller;
a compartment positioning mechanism operated by the controller to move the passenger compartment relative to the chassis at a plurality of locations on the track; and
a power supply assembly comprising a first charging element mounted on or near the track in a load/unload section of the track, comprising a second charging element mounted on or near the track in a gravity-based ride section of the track, and further comprising an onboard energy storage with a first storage device mounted on the vehicle that is charged by the first charging element and a second storage device mounted on the vehicle that is charged by the second charging element,
wherein the onboard energy storage provides power to the compartment positioning mechanism to move the passenger compartment based on a motion profile or in response to a sensed trigger element proximate to the track, and
wherein the compartment positioning mechanism moves the passenger compartment according to the motion profile or in response to the sensed trigger element by rotating the passenger compartment about a vertical axis of the passenger compartment, whereby a yaw motion is provided in the gravity-based ride section and wherein the compartment positioning mechanism comprises a drive assembly powered by the onboard energy storage to provide the rotating wherein the plurality of locations are each in the gravity-based ride section and are each spaced apart a distance from the second charging element, whereby the onboard energy storage is disconnected from the first and second charging elements while powering the compartment positioning mechanism.

15. The roller coaster of claim 14, wherein the first and second storage devices each comprises at least one of a battery, a capacitor, and a super capacitor and wherein the first and second charging elements each comprises at least one of a capacitor charge plate, a bus bar, and a bus bar charging strip.

* * * * *